United States Patent [19]

Luetzelschwab

[11] Patent Number: 4,849,182

[45] Date of Patent: Jul. 18, 1989

[54] APPARATUS AND METHOD FOR THE CONTINUOUS PRODUCTION OF AQUEOUS POLYMER SOLUTIONS

[75] Inventor: Wayne E. Luetzelschwab, Littleton, Colo.

[73] Assignee: Marathon Oil Company, Findlay, Ohio

[21] Appl. No.: 193,812

[22] Filed: May 13, 1988

Related U.S. Application Data

[60] Continuation of Ser. No. 871,682, Jun. 9, 1986, abandoned, which is a division of Ser. No. 742,053, Jun. 6, 1985, Pat. No. 4,661,538.

[51] Int. Cl.$^4$ .............. B01F 3/08; B01F 5/00; B01J 14/00
[52] U.S. Cl. .................. 422/134; 422/135; 422/189; 422/224
[58] Field of Search ............ 422/131, 134, 135, 189, 422/224, 202

[56] References Cited

U.S. PATENT DOCUMENTS

| | | | |
|---|---|---|---|
| 2,740,696 | 4/1956 | Longwell | 422/135 |
| 2,906,610 | 9/1959 | Clinkenbeard et al. | 422/189 |
| 3,639,372 | 2/1972 | Haynes | 422/134 |
| 3,836,336 | 9/1974 | Yasui et al. | 422/134 |
| 3,880,921 | 4/1975 | Hellemanns et al. | 422/202 |
| 4,363,784 | 12/1982 | Hilbig | 422/134 |
| 4,370,304 | 1/1983 | Hendriks | 422/224 |
| 4,424,301 | 1/1984 | Klippert | 422/134 |
| 4,485,210 | 11/1984 | Neiditch et al. | 422/137 |

Primary Examiner—Michael S. Marcus
Attorney, Agent, or Firm—Jack L. Hummel

[57] ABSTRACT

Apparatus and method for the continuous preparation of dilute solutions of water soluble polymers, and especially to a closed, on-site arrangement for the continuous production of partially hydrolyzed polyacrylamide solutions for use in the secondary and tertiary recovery of oil from subterranean, oil-bearing reservoirs. The apparatus, in its preferred form, comprises an in-line system which includes a polymerization reactor, a hydrolysis reactor and a diluter. The dimensions of the reactors are such that the reactions taking place therein will go to completion as the reaction mixtures move from the inlet to the outlet of the reactors. Drag means advantageously are positioned in the reactors to control the flow rate of the reaction mixtures and to promote intermixing of the reactants. The diluter of the system incorporates a plurality of polymer dispersing stations which act to progressively increase the water absorbing surface area of the polymer as the polymer solution passes through each station. The diluted end product is characterized by its ability to meet the performance demands of substantially any oil-bearing formation.

9 Claims, 1 Drawing Sheet

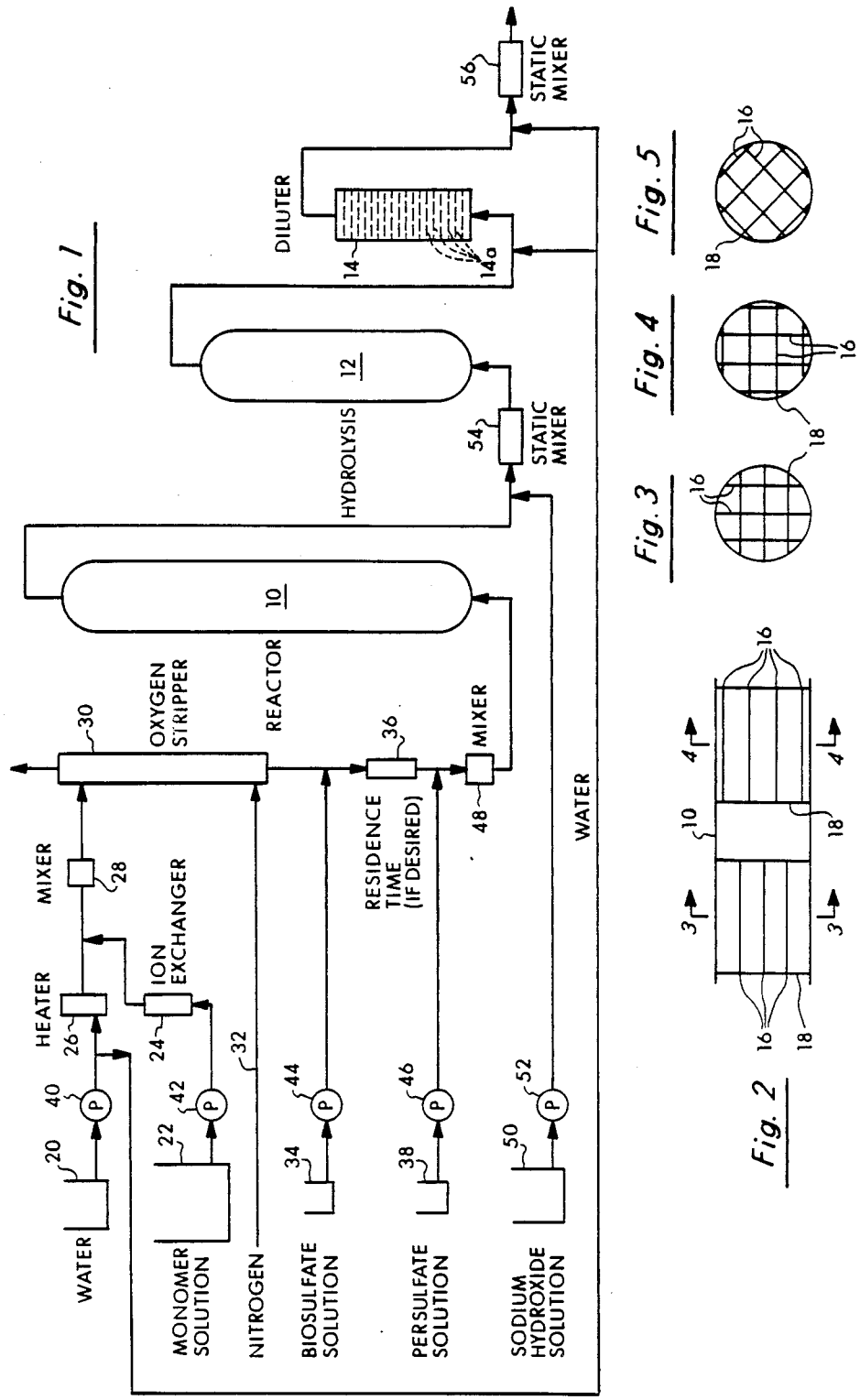

4,849,182

APPARATUS AND METHOD FOR THE CONTINUOUS PRODUCTION OF AQUEOUS POLYMER SOLUTIONS

This application is a continuation of application Ser. No. 06/871,682, filed June 9, 1986, abandoned, which application is a divisional application of application Ser. No. 06/742,053, filed June 6, 1985, now U.S. Pat. No. 4,661,538, dated Apr. 28, 1987.

TECHNICAL FIELD

This invention relates to apparatus, and to a method, for the production of aqueous polymer solutions, and especially to apparatus and to a method for the on-site, continuous production of such solutions for use in the secondary and tertiary recovery of oil from subterranean, oil-bearing formations.

BACKGROUND OF PRIOR ART

Apparatus and methods for the continuous polymerization of water soluble polymers are the subject matter of a number of U.S. patents. Thus, U.S. Pat. No. 2,820,777 discloses a continuous process for polymerizing and hydrolyzing acrylamide. The patent contains no teaching with regard to apparatus for carrying out the process. U.S. Pat. No. 3,732,193 discloses a continuous polymerization process in which an aqueous solution of a water soluble unsaturated monomer such as acrylamide is polymerized on a heated, continuously moving belt to produce a polymer in a dry, thin film form. In U.S. Pat. No. 4,110,521 there is disclosed apparatus for the continuous polymerization of water soluble polymers. The apparatus comprises a jacketed, tubular reactor which contains static mixers, a jacketed post reactor, also containing static mixers, and a diluter containing static mixers for mixing the polymer and water feeds. A jacketed tank is provided for retaining reactants to be added to the post reactor. According to the patent, the end product from the diluter can go to bulk storage or it may be used directly.

The apparatus disclosed in U.S. Pat. No. 3,732,193 would, for all practical purposes, be useless for the on-site preparation of aqueous polymer solutions of the type employed in the secondary and tertiary recovery of oil from subterranean oil-bearing formations. The apparatus shown in U.S. Pat. No. 4,110,521, while having obvious advantages over the apparatus of U.S. Pat. No. 3,732,193 for the preparation of aqueous polymer solutions for use in secondary and teritiary oil recovery operations, has a number of shortcomings which detract from its adaptation for the on-site preparation of such solutions. More specifically in this connection, the apparatus of the patent is characterized by its extensive use of static mixers. Static mixers are costly and their use on the scale contemplated in the patent would make the apparatus prohibitively expensive. In addition, the apparatus of the patent requires the use of temperature control jackets not only on the reactors, but, also, on each of the tanks or vessels used for the reactants. The use of cooling or heating jackets of the size and type contemplated in the patent further adds to the complexity and to the cost of the apparatus. Yet another significant shortcoming of the apparatus of the patent, and one to which no reference is made in the patent, concerns the properties of the polymer solutions prepared with the apparatus. Thus, while the patent has for one of its objects the provision of apparatus in which the reaction conditions are controlled to produce polymers of uniform molecular weight and molecular weight distribution, it does not disclose means for preparing polymer solutions in a manner to prevent, or reduce to minimum levels, degradation of the polymer comprising the solutions. Degradation, or thinning, of the polymer adversely affects the injectivity and mobility properties of the polymer solution thereby lessening to an appreciable degree its ability to satisfy the performance demands of an oil-bearing formation.

BRIEF SUMMARY OF THE INVENTION

The apparatus, and method, of the present invention are uniquely adapted for the on-site, continuous preparation of aqueous polymer solutions, especially aqueous partially hydrolyzed polyacrylamide solutions for use as drive fluids and/or mobility buffers in the secondary or tertiary recovery of oil from subterranean oil-bearing formations or reservoirs. The apparatus is inexpensive to build, and easy to install and operate. What is more, it enables the formation of the polymer solutions to be closely controlled at all stages in their preparation to provide an end product having predictable properties from the standpoint of its ability to meet the performance demands of substantially any oil-bearing formation or reservoir. The apparatus of this invention is further characterized in that no pumps are required to handle concentrated polymer solutions, and in that, where employed, the pumps are advantageously located only on the inlet feed stream side of the apparatus.

The apparatus, in a preferred embodiment of the invention, comprises a polymerization reactor, a hydrolysis reactor and a diluter. The polymerization and hydrolysis reactors each desirably take the form of an elongated tube or pipe having a length and cross-sectional area such that the residence time of the reaction mixture in the tube or pipe, at a predetermined rate of flow, will be sufficient to enable the reaction taking place in the tube or pipe to go to completion. The dimensions of the reactors advantageously can be proportioned to optimum size by incorporating fluid flow control or retarding means in the reactors to reduce the rate of flow of the reaction mixtures in a manner to assure completion of the desired reactions. The diluter employed in the apparatus is characterized in that it is capable of achieving dilution of a polymer solution, such as a partially hydrolyzed polyacrylamide solution, to a predetermined concentration without any adverse affect on the integrity of the polymer comprising the solution.

The foregoing, and other features and advantages of the invention will become more apparent from the description to follow, taken in conjunction with the accompanying drawing.

BRIEF DESCRIPTION OF THE DRAWINGS

FIG. 1 is a schematic view of an embodiment of the apparatus of the present invention;

FIG. 2 is a schematic sectional view showing embodiments of fluid flow control or retarding means arranged in a reactor; and FIGS. 3, 4 and 5 are schematic sectional views at a right angle to the view of FIG. 2.

DETAILED DESCRIPTION OF THE INVENTION

The embodiment of the apparatus shown in FIG. 1 comprises a polymerization reactor 10, a hydrolysis reactor 12 and a diluter 14. The reactors 10 and 12, and the diluter 14 desirably are fabricated of stainless steel tubing or piping, and each is provided with an inlet and an outlet. The ends of the reactors 10 and 12 advantageously are rounded or cupped to improve the flow pattern of the fluids entering and exiting the reactors. The dimensions of the reactors 10 and 12, and the diluter 14 are variable, and will be determined, in the case of the reactors 10 and 12, by the residence time, at a preselected flow rate, required to complete the reaction taking place in the reactors, and, in the case of the diluter 14, by the residence time, at a preselected flow rate, to provide a polymer solution of a desired concentration. Thus, by way of illustration, in utilizing the apparatus of this invention for the continuous preparation of a dilute aqueous solution of a partially hydrolyzed polyacrylamide, the polymerization reactor 10 advantageously will have a length to diameter ratio of the order of from about 6:1 to about 10:1, while the hydrolysis reaction 12 preferably will have a length to diameter ratio ranging from about 4:1 to about 6:1. The diluter 14, on the other hand, can have a length to diameter ratio of from about 30:1 to about 10:1.

As indicated above, the dimensions, in particular, the volume of the reactors 10 and 12 can be reduced to optimum capacity by providing flow control or retarding means within the reactors. Such means may comprise screens positioned substantially perpendicular to the flow of fluids in the reactors; plates parallel to flow; plates in the form of a grid parallel to flow; or rods parallel to flow. In FIGS. 2 through 5 of the drawings, arrangement comprising a plurality of plates 16 in the form of a grid 18 is shown in the reactor 10. More than one grid may be employed as shown, and the grids may be spaced from one another, and each grid may be oriented at different angle with relation to the other grids in the reactor. By thus spacing the grids, and rotating them so that the plates of each grid lie in different planes with relation to the plates of the other grids, a more even, overall flow pattern is obtained. In those instances where control of the temperature of the reaction mixture in the reactors is desired, coils for either heating or cooling the reaction mixture may be incorporated in the reactors in place of drag producing means such as rods parallel to the flow of fluid in the reactors.

The diluter 14 of the apparatus illustrated in FIG. 1 desirably is provided internally with a plurality of polymer solution dispersing stations 14a. The stations may comprise perforated plates or screens, or a combination of perforated plates and screens. A unit suitable for use as the diluter 14 is described in my copending U.S. patent application Ser. No. 279,027, filed: June 30, 1981, entitled: Dilution Apparatus and Method. The diluter 14 is unique in that it is capable of achieving the dilution of polymer solutions such as aqueous solutions of partially hydrolyzed polyacrylamide without any concomitant degradation or thinning of the polymer thereby enabling the preparation of an end product having the injectivity and mobility properties necessary to meet the performance demands of an oil-bearing formation or reservoir.

Referring, now, in greater detail to FIG. 1 of the drawing, the apparatus as shown is especially suited for the on-site, continous preparation of polymer solutions for use in the secondary or tertiary recovery of coil. To this end, there is located upstream of the reactors 10 and 12 tanks and auxiliary equipment necessary for the preparation of a polymer solution suitable for injection into an input well of an oil-bearing formation or reservoir. As shown, a water tank 20, connected to a source of water, and a storage tank 22 for holding a supply of an aqueous solution of a monomer such as acrylamide, are provided. Prior to entraining the monomer solution from the tank 22 in the water stream, the monomer solution may be passed through an ion exchanger 24 to remove metallic ions such as copper which may interfere with the polymerization reaction. The water stream, itself, may be passed through a heater 26 to raise the temperature of the water sufficiently to facilitate initiation of the polymerization reaction. After the monomer solution is entrained in the water stream from the water source, it desirably is passed through a static mixer 28 to achieved thorough distribution of the monomer solution in the reaction mixture. From the mixer 28, the aqueous monomer solution is passed to an oxygen stripper 30. The oxygen stripper is in communication with a source of nitrogen gas 32. Nitrogen gas is bubbled through the monomer solution in the stripper 30 to remove dissolved oxygen from the solution.

As illustrated, a first catalyst from a tank 34 is added to the monomer solution as it exits from the stripper 30. The catalyst may be selected from any of a number of organic and inorganic compounds employed in the polymerization of monomers. Mixtures of such catalysts may be employed, and may be added separately, as shown in FIG. 1, to the monomer solution. The monomer solution, in the presence of the first catalyst, may, if desired, be held in a small tank or large diameter pipe 36 for a short period. The monomer-catalyst solution is then discharged from the tank 36, and a second catalyst from a tank 38 is added. In the embodiment of the apparatus illustrated pumps 40, 44, 44 and 46 are associated with the water tank 20, the monomer storage tank 22, and the catalysts tanks 34 and 38, respectively. After addition of the second catalyst, the monomer solution, together with the catalysts, may then be passed through a static mixer 48, and into the polymerization reactor 10.

The residence time of the reaction mixture in the reactor 10 can range from about 7 to about 10 hours, after which the resulting polymer solution is discharged from the reactor 10 and conveyed to a point where a hydrolyzing agent from a storage tank 50 is incorporated by means of a pump 52 into the polymer solution. The thusly formed reaction mixture is then advantageously passed through a static mixer 54 from where it is conveyed to the hydrolysis reactor 12.

The residence time of the reaction mixture in the reactor 12 can range from about 4 to about 6 hours, after which the hydrolyzed polymer solution is conveyed to the diluter 14. Water from the source is fed into the diluter 14 along with the hydrolyzed polymer solution from the reactor 12. The diluted solution exits from the diluter, and is conveyed to a static mixer 56 where additional water from the source is introduced. The diluted solution exiting from the mixer 56 can be conveyed directly to an input well, for example, or it can be conveyed to a storage area where it may be further diluted prior to use.

In order to illustrate the specific utility of the apparatus for preparing a dilute aqueous solution of a partially hydrolyzed polyacrylamide, a monomer solution comprising 50%, by weight, acrylamide is passed through an ion exchanger at a rate of about 0.7 lb./min. to remove any copper ion present in the solution. The solution is then introduced into a stream of water preheated to a temperature of about 110° F. The heated solution is passed through a static mixer and then through an oxygen stripper where it is purged of any dissolved oxygen with nitrogen gas. As the purged solution leaves the stripper, a 25% by weight aqueous solution of sodium bisulfite is metered into the solution at a rate of about 0.00025 lb./min. The catalyzed solution is then conveyed to a small (6 gal.) residence tank where it remains for about 15 minutes. As the solution exits the residence tank, a second catalyst solution comprising a 25% by weight aqueous ammonium persulfate solution, is metered into the monomer solution at a rate of about 0.0005 lb./min. The monomer-catalysts solution is then passed through a static mixer and fed, at a rate of about 5.7 lbs./min., at a temperature of 105° F., and under a pressure of 100 psig, into a polymerization reactor. The reactor is about 16 feet long and 2 feet in diameter, and has a capacity of approximately 375 gallons. Polymerization of the monomer in the reactor proceeds over a period of about 9 hours. The polymer solution undergoes an increase in temperature in the reactor to a level of about 135° F. The resulting 6% by weight polyacrylamide solution formed in the reactor exits the reactor at a rate of about 5.7 lb./min., under a pressure of about 90 psig. A 50% by weight aqueous solution of sodium hydroxide is metered by a pump into the polymer solution at a rate of about 0.11 lb./min., and a pressure of 90 psig. The temperature of the hydroxide solution is approximately 75° F. The polymer-caustic solution is first passed through a static mixer and then into a hydrolysis reactor. The reactor is approximately 10 feet long and 2 feet in diameter, and has a capacity of approximately 235 gallons.

Hydrolysis of the polymer in the reactor is allowed to proceed over a period of about 6 hours. The percent hydrolysis of the polyacrylamide is approximately 30%. The concentration of the partially hydrolyzed polyacrylamide in the solution is about 6.6% by weight. The hydrolyzed polymer solution has a temperature of about 135° F. The solution is then conveyed at the rate of about 5.79 lb./min., at a pressure of about 60 psig to a sequential screen diluter comprising a tube about 4 inches in diameter and about 10 feet in length. The diluter desirably has six polymer dispersing stations, each comprising screens having a different mesh size, the mesh size of the screens progressively decreasing from the inlet end of the diluter to the outlet end thereof. Water at a temperature of about 70° F. is fed at a rate of about 32.4 lb./min., under a pressure of 75 psig, into the diluter simultaneously with the hydrolyzed polymer solution. The solution is diluted down in the diluter to provide a solution comprising about 1% by weight of a partially hydrolyzed polyacrylamide. The residence time of the solution in the diluter is about 2 minutes. The 1% solution is conveyed from the diluter at a rate of about 38 lb./min. under a pressure of about 20 psig, and a temperature of about 80° F., to a point where additional water, at a temperature of about 70° F., is fed into the solution at a rate of about 295 lb./min., under a pressure of about 35 psig. The solution, with the added water, is then passed through a static mixer to provide a 0.1% solution of the partially hydrolyzed polyacrylamide. The diluted solution is ready for injection into an input well as a mobility control buffer, or as a drive fluid.

While the apparatus and method of the present invention have been described and illustrated with relation to their specific use in the preparation of partially hydrolyzed polyacrylamide solutions, it should be understood that such description and showing have been given by way of illustration and example, and not by way of limitation, and that the apparatus and method may be adapted for use in the preparation of other polymer solutions.

I claim:

1. Apparatus for the continuous, on-site production of dilute aqueous solutions of water soluble partially hydrolyzed polyacrylamides for injection into an input well of a subterranean, oil-bearing formation, comprising: means for providing a polymer forming reaction mixture consisting essentially of at least one water soluble polymerizable acrylamide and at least one polymerization catalyst in an amount sufficient to substantially completely polymerize the acrylamide; first reactor means having an inlet end for receiving the reaction mixture and an outlet end for discharging the polymer solution formed from the reaction mixture, said first reactor means having a longitudinal axis and being characterized in that it has a length and cross-sectional area such that the residence time of the reaction mixture therein is sufficient to substantially completely polymerize said acrylamide; stationary fluid flow regulating means provided in said first reactor means for controlling the rate of the flow of the reaction mixture from the inlet end to the outlet end thereof, said stationary fluid flow regulating means comprising a plurality of substantially parallel, elongated flow retarding surfaces extending substantially parallel to the flow of the fluid in said first reactor means; means for introducing a chemical reactant into the polymer solution formed in said first reactor means for modifying the polymer in the solution; second reactor means in communication with the outlet end of said first reactor means, said second reactor means having an inlet end and an outlet end, and being characterized in that it has a length and a cross-sectional area such that the residence time therein of the polymer solution from the first reactor means is sufficient to modify the polymer solution; and diluter means in communication with the second reactor means for incorporating a predetermined quantity of a diluent into the modified polymer solution prior to injection of the modified polymer solution into an input well of an oil-bearing subterranean formation, said diluter means including a plurality of spaced, perforated members which act to bring about dilution of the modified polymer solution without degradation of the polymer in the solution.

2. Apparatus according to claim 1 wherein the flow regulating means comprises a grid formed of plate members, the plate members being spaced from one another along an axis transverse to the direction of flow of the reaction mixture along the longitudinal axis of the first reactor means.

3. Apparatus according to claim 1 wherein the flow regulating means comprises at least two grids formed of plate members, the grids being positioned in spaced apart relation to one another and the plate members comprising one of the grids lying in a plane different from that of the plate members comprising the other grid.

4. Apparatus according to claim 1 wherein the flow regulating means comprises a plurality of hollow tubes positioned in spaced relation to one another in said first reactor means with their longitudinal axis being substantially parallel to the longitudinal axis of said first reactor means.

5. Apparatus according to claim 4 wherein the hollow tubes are in communication with a source of fluid for regulating the temperature of the reaction mixture in said first reaction means.

6. Apparatus according to claim 1 wherein the perforated members include screens having a mesh size such that the surface area of the modified polymer solution will be increased as it successively passes through the screens.

7. Apparatus for the preparation of dilute aqueous solutions of water soluble partially hydrolyzed polyacrylamides for injection into and input well of a subterranean oil-bearing formation, comprising: means for providing a polymer forming reaction mixture containing at least one acrylamide monomer; first reactor means having an inlet end for receiving the reaction mixture and an outlet end for discharging the polymer solution formed from the reaction mixture, said first reactor means having a longitudinal axis and being characterized in that it has a length and cross-sectional area such that the residence time of the reaction mixture therein is sufficient to substantially completely polymerize said at least one monomer; stationary fluid flow regulating means provided in said first reactor means for controlling the rate of the flow of the reaction mixture from the inlet end to the outlet end thereof, said stationary fluid regulating means comprising a plurality of substantially parallel, elongated flow retarding surfaces extending substantially parallel to the flow of fluid in said first reactor means; means for introducing a chemical reactant into the polymer solution formed in said first reactor means for modifying the polymer in the solution; second reactor means in communication with the outlet end of the first reactor means, said second reactor means having an inlet at one end thereof and an outlet at the other end thereof, and being characterized in that it has a length and a cross-sectional area such that the residence time in the second reactor means of the polymer solution at a continuous rate of flow is sufficient to modify the polymer solution from said first reactor means; and diluter means in communication with the outlet of said second reactor means, said diluter means comprising a plurality of perforated members positioned in spaced apart relation to one another along the length of the diluter means, the perforations in at least some of the perforated members varying in size from one of said members to the next, said diluter means acting to bring about dilution of the modified polymer solution without degradation of the polymer in the solution.

8. Apparatus for the continuous preparation of dilute aqueous solutions of water soluble partially hydrolyzed polyacrylamides for injection into an input well of a subterranean oil-bearing formation, comprising: a closed, in-line system which includes means for providing a polymer forming reaction mixture containing at least one polymerizable acrylamide monomer; first reactor means in communication with said first mentioned means for receiving the reaction mixture, said first reactor means having a longitudinal axis and being characterized in that it has a length and cross-sectional area such that the residence time of the reaction mixture therein at a predetermined rate of flow is sufficient to substantially completely polymerize said at least one monomer; stationary fluid flow regulating means provided in said first reactor means for controlling the rate of flow of the reaction mixture therein, said stationary fluid flow regulating means comprising a plurality of substantially parallel, elongated flow retarding surfaces extending substantially parallel to the flow of the fluid in said first reactor means; means for introducing a chemical reactant into the reaction product from the first reactor means for modifying same; second reactor means in communication with the first reactor means for modifying the reaction product from the first reactor means, said second reactor means having a length and a cross-sectional area such that the residence time of the reaction mixture therein is sufficient to modify the reaction product from the first reactor means in a predetermined manner; and diluter means in communication with the second reactor means for incorporating a predetermined quantity of diluent into the reaction product from the second reactor means, said diluter means comprising a plurality of screen members positioned in spaced apart relation to one another along the length of the diluter means, the mesh size of at least some of the screen members varying in size from one screen member to the next, said screen members acting to bring about dilution of the reaction product from the second reactor means without degradation of the reaction product.

9. Apparatus for the continuous preparation of dilute aqueous solutions of water soluble partially hydrolyzed polyacrylamides for injection into an input well of a subterranean oil-bearing formation, comprising: a closed, in-line system which includes means for providing a polymer forming reaction mixture containing at least one polymerizable acrylamide monomer; first reactor means in communication with said first mentioned means for receiving the reaction mixture, said first reactor means having a longitudinal axis and being characterized in that it has a length and cross-sectional area such that the residence time of the mixture therein at a predetermined rate of flow is sufficient to substantially completely polymerize said at least one monomer; stationary fluid flow regulating means provided in said first reactor means for controlling the rate of flow of the reaction mixture therein, said stationary fluid flow regulating means comprising a plurality of substantially parallel, elongated flow retarding surfaces extending substantially parallel to the flow of the fluid in said first reactor means; means for introducing a chemical reactant into the reaction product from the first reactor means for modifying same; second reactor means in communication with the first reactor means, said second reactor means having a length and a cross-sectional area such that the residence time of the reaction mixture therein is sufficient to modify the reaction product from the first reaction means in a predetermined manner; and diluter means in communication with the second reactor means for incorporating a predetermined quantity of diluent into the reaction product from the second reactor means, said diluter means comprising first diluter means and second diluter means, said first diluter means comprising an elongated cylindrically shaped member having a chamber in which a plurality of spaced dispersing stations are positioned, at least some of the stations comprising screens having a preselected mesh size, said stations acting to bring about dilution of the reaction product from the second reactor means without degradation of said reaction product, said second diluter means being positioned downstream from said first diluter means and serving to disperse additional diluent in the diluted reaction product from the first diluter means.

* * * * *

UNITED STATES PATENT AND TRADEMARK OFFICE
CERTIFICATE OF CORRECTION

PATENT NO. : 4,849,182

DATED : July 18, 1989

INVENTOR(S) : Wayne E. Luetzelschwab

It is certified that error appears in the above-identified patent and that said Letters Patent is hereby corrected as shown below:

| | |
|---|---|
| Col. 3, line 32: | Before "arrangement" insert --an--. |
| Col. 3, line 65: | Delete "coil" and insert --oil--. |
| Col. 4, line 15: | Delete "achieved" and insert --achieve--. |
| Col. 8, line 35: | Before "mixture" insert --reaction--. |

Signed and Sealed this

Twenty-fourth Day of April, 1990

Attest:

HARRY F. MANBECK, JR.

*Attesting Officer*  *Commissioner of Patents and Trademarks*